July 26, 1938.  E. H. TOMPKINS ET AL  2,125,038
ONE-HAND FOCUSING FLASHLIGHT
Filed May 11, 1937   4 Sheets-Sheet 1
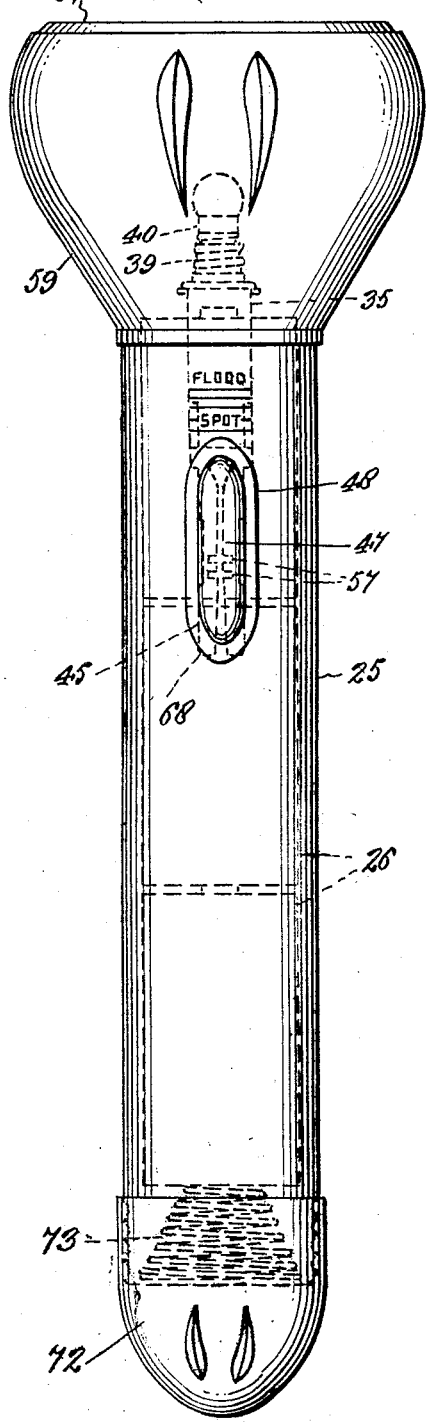
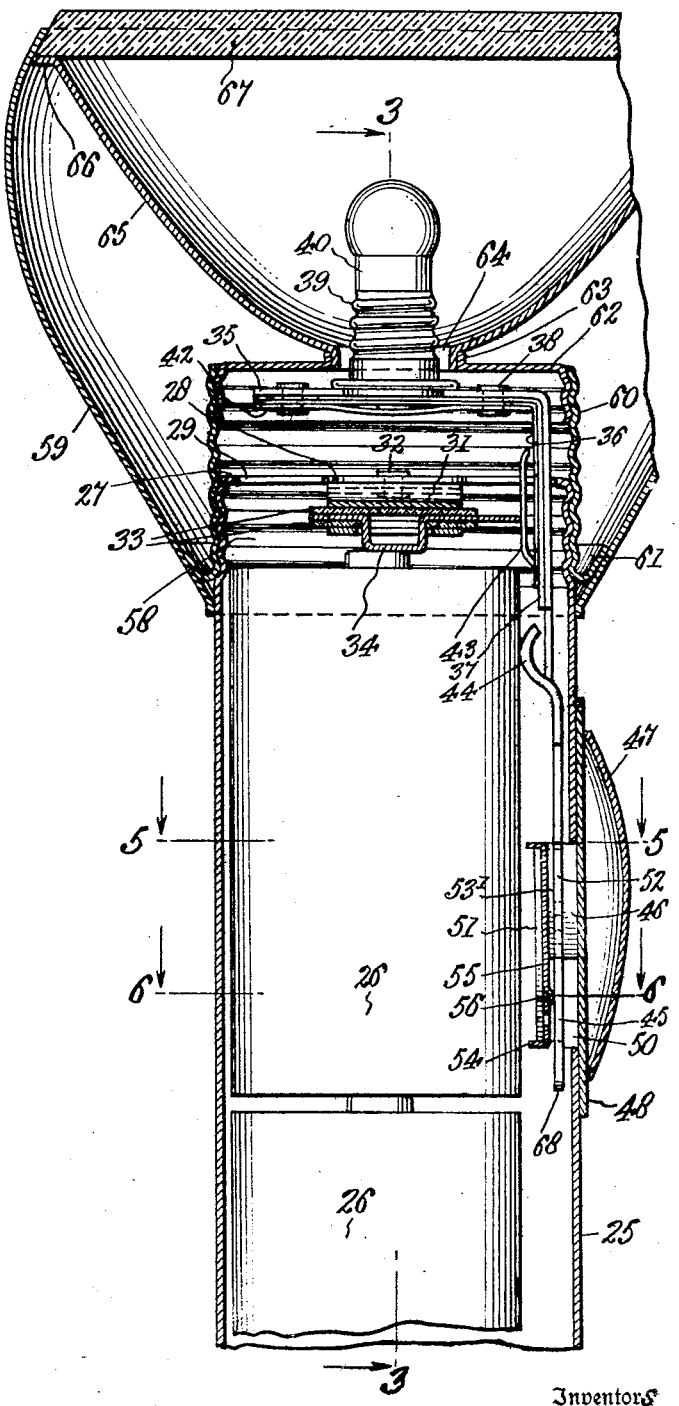
Inventors
Emerson H. Tompkins
and Irving T. Holihan
By Mawhinney & Mawhinney
Attorneys July 26, 1938.  E. H. TOMPKINS ET AL  2,125,038
ONE-HAND FOCUSING FLASHLIGHT
Filed May 11, 1937   4 Sheets-Sheet 2

Inventors
Emerson H. Tompkins
Irving T. Holihan
By Mawhinney & Mawhinney
Attorneys

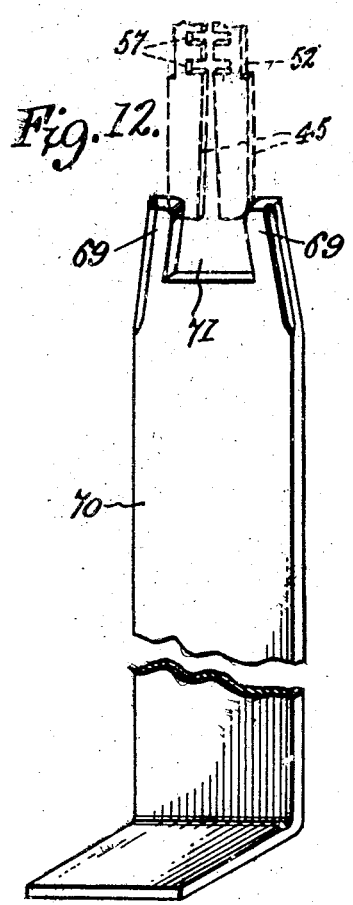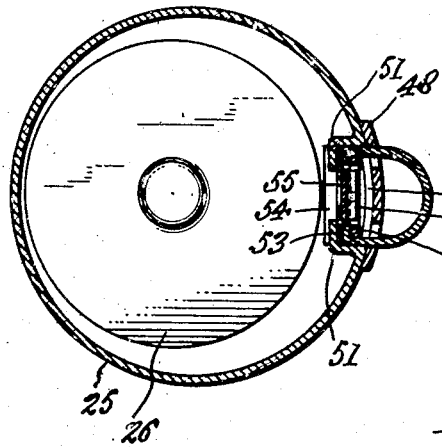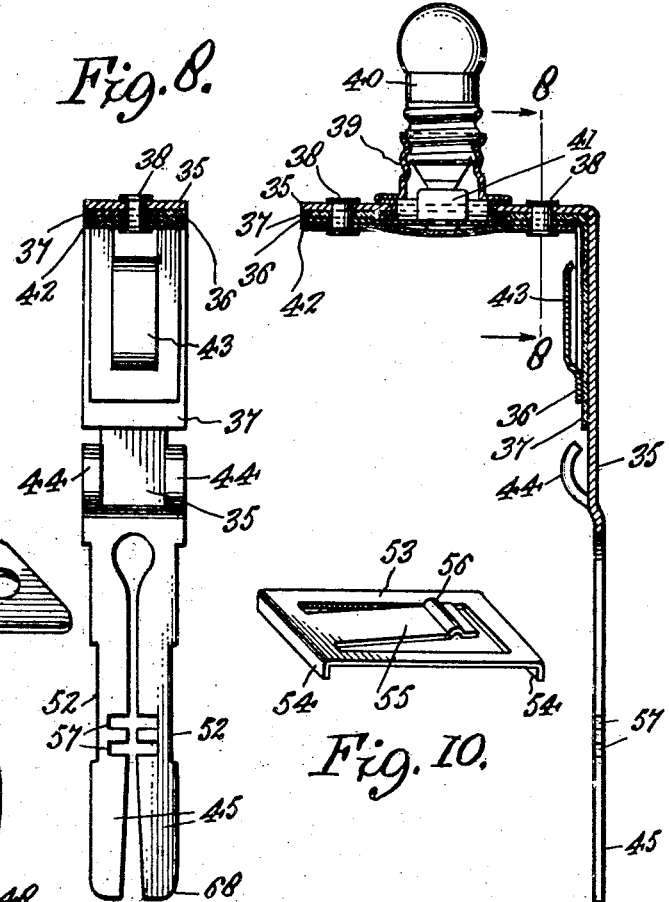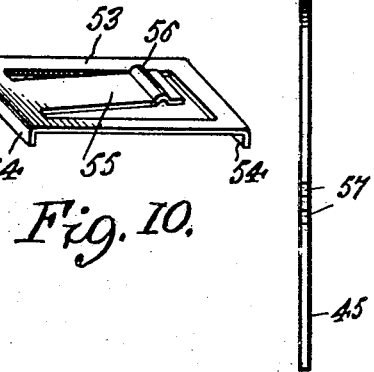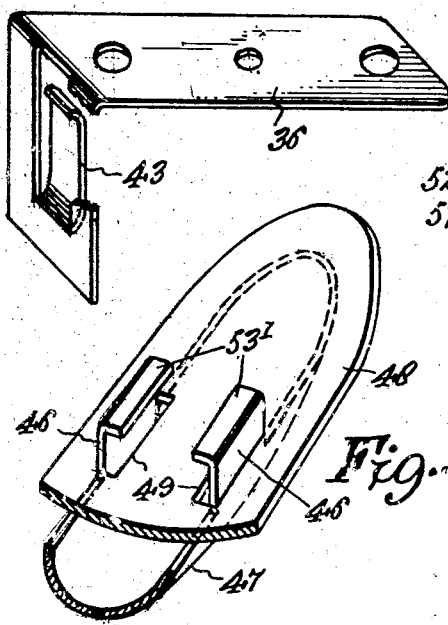

July 26, 1938. E. H. TOMPKINS ET AL 2,125,038
ONE-HAND FOCUSING FLASHLIGHT
Filed May 11, 1937 4 Sheets—Sheet 4
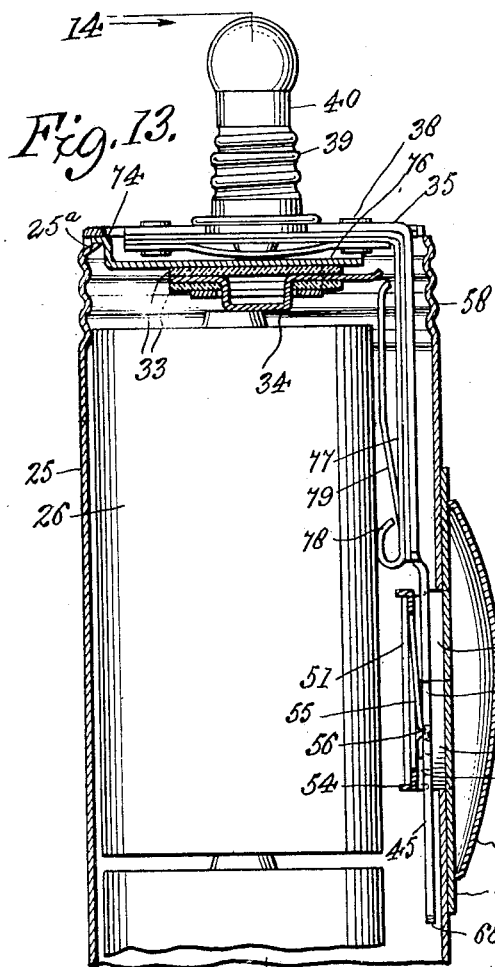
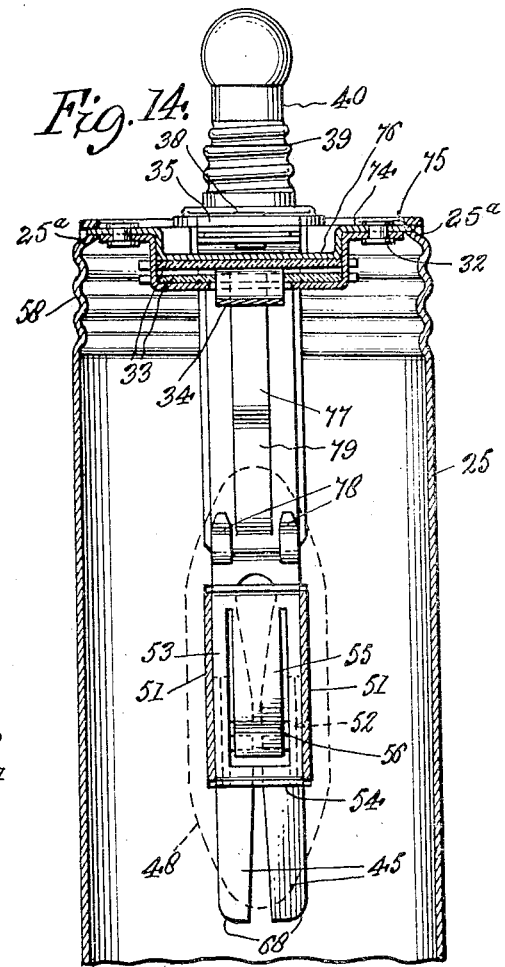
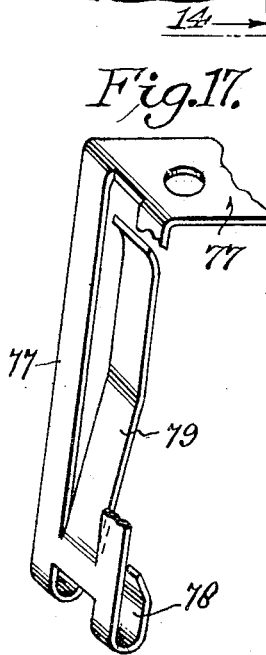
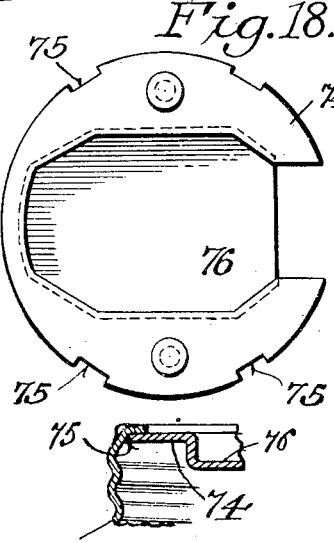
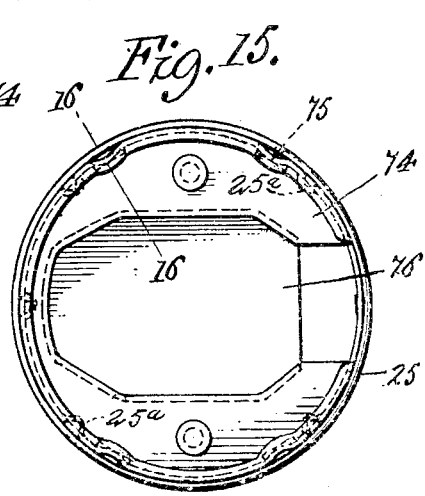

Patented July 26, 1938

2,125,038

UNITED STATES PATENT OFFICE 2,125,038

ONE-HAND FOCUSING FLASHLIGHT

Emerson H. Tompkins, Waterbury, and Irving T. Holihan, Waterville, Conn., assignors to Scovil Manufacturing Company, Waterbury, Conn., a corporation of Connecticut Application May 11, 1937, Serial No. 142,040

9 Claims. (Cl. 240—10.66)

The present invention relates to flashlights, and has for an object to provide a simple and economically constructed flashlight capable of being carried in and operated by one hand to control the closing and opening of the light circuit and to adjust the focus of the light source in the reflector.

This invention is an improvement on the flashlight construction disclosed and claimed in the application Serial No. 110,513, filed November 12, 1936 by Albert J. Scholtes.

Another object of the invention is to provide a flashlight structure embracing several independently manufactured parts capable of being assembled quickly and easily together, and releasably interlocked to prevent accidental separation of the parts both when in use and when toying with the flashlight, but wherein the parts may be released by a key or other suitable tool by a repairman or the like for admitting the easy separation, substitution and repair of any of the parts or units of the flashlight.

A further object of the invention is to provide a novel and compact battery contact member and cooperating circuit closing slide, admitting disposition of the member wholly within the flashlight casing and providing ample space at the outer end of the casing for axial adjustment of the light source and to accommodate the reflector and other adjacent parts of the device.

A still further object of the invention is to provide a novel and economical mounting of the end wall on the end of the casing of the flashlight.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a flashlight embodying the features of this invention.

Figure 2 is a fragmentary enlarged sectional view taken longitudinally through the outer or head end of the flashlight, with the lamp in fully projected position.

Figure 6 is a similar view taken on the line 6—6 through the lower intermediate portion of the flashlight.

Figure 7 is a detail longitudinal section taken through the lamp carrying slide.

Figure 8 is an inner face view thereof, showing the upper part in section on the line 8—8 of Figure 7.

Figure 9 is a detail perspective view, partly broken away, of the inner strap of the lamp carrying slide, showing the battery sliding contact tongue.

Figure 10 is a detail perspective view of the latch plate detachably carried in the side of the casing.

Figure 11 is an inner side perspective view, partly broken away, of the exterior thumb piece and slide plate assembled together.

Figure 12 is a perspective view of one form of releasing tool, partly broken away, as applied to the lower end of the releasable lamp carrying slide, the latter being shown in dotted lines.

Figure 13 is a longitudinal section taken through the outer or head end of a flashlight with the head shell removed, showing a modification in the lamp carrying slide and the battery side contacts.

Figure 14 is a similar view, partly in section, but taken axially at right angles on the line 14—14 of Figure 13.

Figure 15 is a detail outer end view of the casing, showing the modified construction thereof.

Figure 16 is a detail, enlarged, fragmentary sectional view of one side of the outer end of the casing, taken on the line 16—16 of Figure 15, and Figure 17 is a detail perspective view of the inner strap of the lamp carrying slide, showing the modified contact and battery holding structure.

Figure 18 is a detail plan view of the end wall of the casing of the flashlight.

Figure 3:
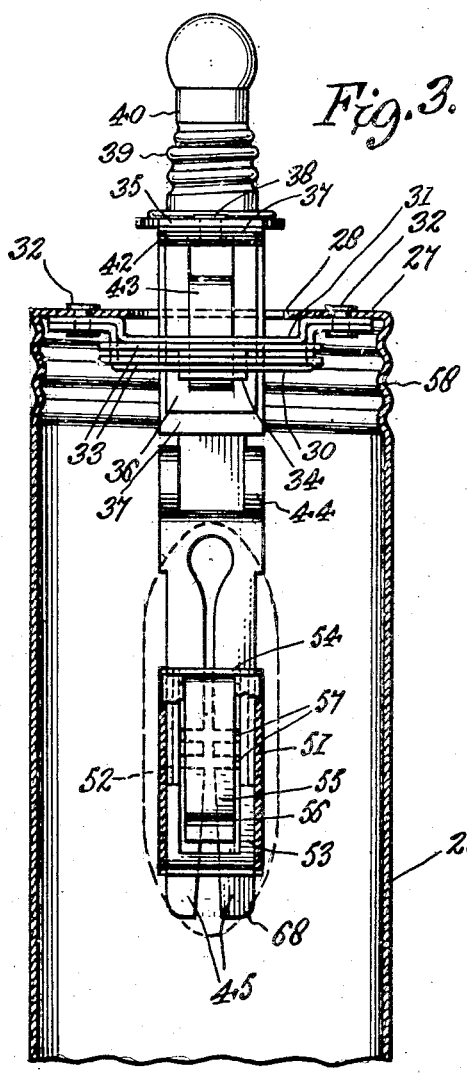
Figure 3 is a similar view but taken axially at right angles on the line 3—3 of Figure 2, with the batteries and head shell removed.
Figure 4:
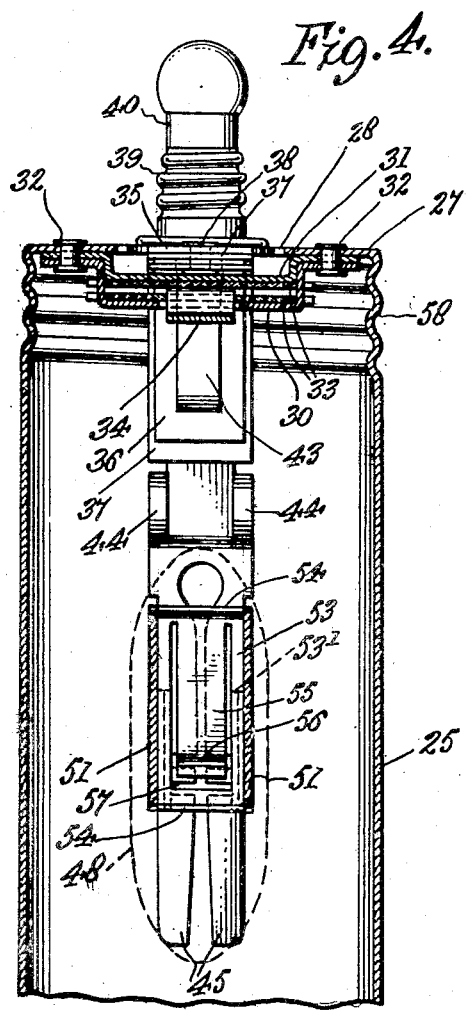
Figure 4 is a like view with the lamp retracted.

Referring now to the drawings, and first to the form shown in Figures 1 to 12, 25 designates a flashlight casing of desired configuration, and of a length adapted to accommodate a desired number of dry cells or batteries 26, or the like source of current supply, for the flashlight.

The casing 25, at its outer or head end, has an end wall 27 with a central opening 28 therein and from the opposite sides of which extend slots 29. The end wall 27 carries at its inner side the battery contact member, and the latter comprises a pair of metallic straps 30 and 31 secured at their opposite ends in superposed relation to the inner side of the wall 27 by rivets 32, or the like, and extending at right angles to the slots 29.

The intermediate portions of the straps 30 and 31 are offset inwardly opposite the central opening 28, and are spaced apart to receive against their inner opposite faces insulating plates 33 of slightly greater width and length than that of the offset portions of the straps 30 and 31. The ends of the insulating plates are notched or recessed to receive therein the bent portions of the strap 30 to hold the plates 33 in place. Clamped between the insulating plates 33, and extending at right angles thereto is a contact strip 34 having an intermediate inwardly extending battery engaging button or projection which may be an inwardly offset portion of the contact strip 34 projecting through suitably formed openings in the lower insulating plate 33 and the lower strap 30, the opening in the latter being larger than the projection to prevent short circuiting between the strap 30 and the contact strip 34.

The projection or button of the contact strip 34 is thus located for direct engagement with the central electrode of the adjacent battery 26. The contact strip 34 extends substantially in parallel relation to the end slots 29 in the casing, and one end of the contact strip 34 projects from the straps 30 and 31 toward the adjacent side of the casing 25, as shown in Figure 2.

A lamp carrying slide is mounted in the casing 25 and, as shown particularly in Figures 7 and 8 is of right angular form with a long shank portion and a head portion extending at right angles from the outer end thereof. The slide comprises an outer metallic strip 35 and an inner metallic strip 36 separated by a strip 37 of insulating material. These strips 35, 36 and 37 are bent at right angles to provide the shank and head of the slide and are secured together by rivets 38, or the like, disposed in the head portion of the slide. A lamp socket 39 is flanged or otherwise suitably secured to the outer strip 35 at the head of the slide and opens at its base inwardly toward the inner strip 36. A lamp 40 is adapted to be screwed into the upper or outer end of the socket, and the central contact of the lamp abuts a stud 41 riveted upon the inner strip 36 and extending in spaced relation to and into the base of the lamp socket 40. An insulating cover strip 42 is disposed across the inner side of the head and is secured thereto by the rivets 38.

In the shank portion of the slide the inner strip 36 and the insulating strip 37 are considerably shorter than the outer strip 35. As shown in Figure 9, particularly, the shank portion of the inner strip 36 has a spring contact tongue 43 stamped therefrom and offset inwardly for yieldable sliding contact with the battery contact strip 34; the shank of the slide being removably disposed through one of the slots 29 in the end of the casing and extending along the inner side thereof between the casing and the batteries 26. The tongue 43 is proportioned in length relative to the movement of the slide such that the free outer end of the tongue 43 passes inwardly of and out of contact with the battery contact 34 to break the circuit therebetween when the slide is completely retracted.

The outer long shank strip 35 has a pair of contact tongues 44 struck inwardly therefrom for yieldable engagement against the outer insulated side of the adjacent battery 26. The bases of the tongues 44, and the adjacent portions of the shank strip 35, are offset outwardly toward the casing wall to dispose the inner end of the strip 35 in close proximity to the casing. The inner end of the shank strip 35 is bifurcated or slotted to provide a pair of spring arms 45 normally sprung apart in an edgewise direction for detachable engagement between a pair of flanges 46 which extend inwardly from a shiftable thumb piece 47 located at the outer side of the casing 25. A face plate 48 is also disposed at the outer side of the casing between the thumb piece 47 and the casing 25 and has slots 49 therethrough, as shown in Figure 11, for the reception of the flanges 46, the slots 49 and the flanges 46 being relatively proportioned to interlock the plate 48 and thumb piece 47 for movement as a unit against the outer side of the casing.

As shown in Figures 2 and 6, the wall of the casing 25 has a slot 50 therethrough with the lateral edge portions of the material from the slot offset inwardly to provide a pair of guide flanges 51 between which the flanges 46 of the thumb piece are adapted to slide. The slot 50 is of greater length than the width of the flanges 46 so that the thumb piece 47 may shift lengthwise on the casing to the desired extent. The spring arms 45 of the shank have, intermediate their ends and in their outer edges, alined recesses 52 of substantially the depth and length of the thumb piece flanges 46 and into which the flanges 46 are adapted to snap under tension of the arms 45 when the recesses are brought into register with the flanges by lengthwise sliding of the shank arms 45 in between the flanges 46. The flanges 46 have their inner ends turned inwardly toward each other to provide shoulders 52¹ overlapping the arms 45 to hold the arms between the flanges, and the ends of the recesses 52 provide shoulders on the arms 45 which engage the edges of the flanges 46 and hold the slide shank 35 for movement with the thumb piece 47 and the face plate 48. The upper and lower outer edge portions of the shank arms 45 slidably engage the inner sides of the fixed guide flanges 51 of the casing.

Figure 5:
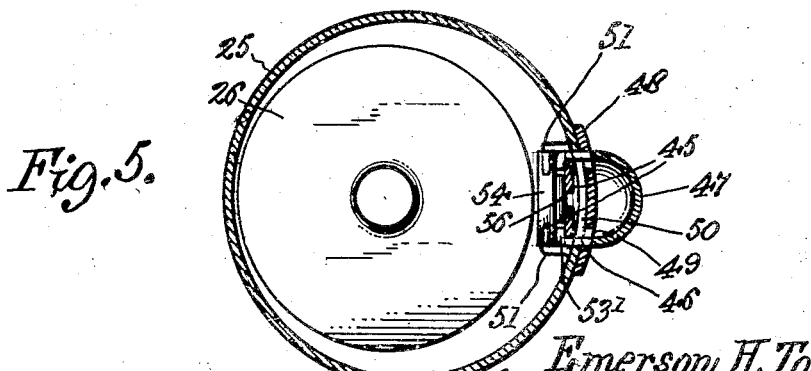
Figure 5 is a transverse section taken on the line 5—5 of Figure 2 through the upper intermediate portion of the flashlight.

In order to yieldably hold the lamp carrying slide in adjusted positions in the casing, a latch plate 53 is provided, see Figure 10. The plate 53 is of a width to fit within the fixed guide flanges 51 of the casing and is of a length equal substantially to the width of the flanges 51, and has its top and bottom edges bent backwardly to provide shoulders 54 which engage the top and bottom edges of the flanges 51 for holding the latch plate 53 from shifting in the guide flanges. The latch plate 53 has a spring latch tongue 55 struck therefrom and sprung from the upper portion of the plate 53 outwardly toward the wall of the casing. The tongue 55 has a transverse crimp or rib 56 pressed inwardly therefrom for yieldable and sliding contact with the inner face of the shank strip 35, as shown in Figures 2, 5 and 6. This spring latch tongue 55 at all times exerts a tension in the shank strip 35 to yieldably hold the lamp carrying slide in adjusted position.

It is desirable to yieldably latch the slide in certain positions, so that those positions may be determined and so that the slide will be held in such positions until an increased or extra pressure is placed on the thumb piece 47 to shift the slide out of those positions. To accomplish this object, the shank strip 35, at any suitable point in its length and preferably in the inner edge portions of the spring arms 45, is provided with transverse slots or sockets 57 spaced apart and disposed relatively to the desired stop positions of the lamp carrying slide. The upper slot 57 may represent the circuit-open position when the slide is retracted into its lowermost position to disengage the contact tongue 43 from the battery contact 34. At this position of the slide the upper slot 57 registers with the latch rib 56 and the latter drops into the slot to yieldingly hold the slide from accidental movement to close the circuit. This is the normal position of the slide when the flashlight is not in use. The next, or lower, slot 57 may be disposed to hold the slide with the lamp 40 at the true focal point in the head of the lamp to produce a spot light. Any desired number of slots 57 may be used according to the desired number of definite positions at which the slide is to stop.

To release the arms 45 of the slide from interlocking engagement with the flanges 46 of the thumb piece 47, the arms 45 must be compressed toward each other sufficiently to free the flanges 46 from the recesses 52, whereupon the slide strip 35 may be slid lengthwise from between the flanges and removed outwardly from the casing 25. Removal of the slide frees the thumb piece 47 with its face plate 48 so that they may be removed from the casing, and also frees the latch plate 53 so that it may be removed from the guide flanges 54.

The outer or upper end of the casing 25 is provided with a threaded portion 58 of a suitable length to receive thereupon the removable head shell of the flashlight. The head shell comprises a hollow body portion 59 of any suitable configuration and which has an opening at its inner end for engagement over the outer end of the casing 25, and which is provided in its interior, and spaced from the lower marginal edge of the body portion 59, with a threaded sleeve 60 adapted to be screwed upon the outer end of the casing 25. This sleeve 60 may be secured in any suitable manner to the hollow body portion 59, such as by an over-turned flange 61 integral with the lower end of the sleeve 60 and which is soldered or otherwise suitably secured to the inner wall of the body portion. When the head shell is in place on the casing the threaded portion 58 of the casing is entirely concealed within the head shell so that a smooth and uninterrupted exterior surface is provided for the outer end of the flashlight. A cap 62 is threaded into, or upon, the outer end of the head sleeve 60 and has a central opening provided with an outstanding marginal flange 63 for the reception of a centrally disposed flange 64 of a reflector 65 adapted to be mounted upon the cap 62 and centered thereon by the interfitting engagement of the flanges 63 and 64. The reflector 65 has a central opening within the flange 64 of sufficient size to freely admit of the axial movement of the lamp 40 and its socket 39 into and out of the reflector.

The reflector 65 is of any suitable construction and configuration adaptable to the particular use of the lamp, and in the present instance is provided at its outer edge with an outstanding flange 66 adapted to bear against the inner side of a marginally beveled lens 67 fitted into the outer end of the hollow body portion 59 as clearly shown in Figure 2. The reflector 65 is proportioned to exert a yielding tension between the outer end of the body portion 59 and the cap 62 for firmly holding the reflector 65 and the lens 67 in position in the head shell.

When the head shell is unscrewed from the casing 25, the cap 62, reflector 65 and the lens 67 are removed therewith as a part of the head shell and the lamp 40 is preferably first retracted to a circuit-opening position so that as the head shell is unscrewed from the casing the reflector 65 will move outwardly over the socket and the lamp and thus the head shell may be more easily removed from the casing by a longitudinal or axial movement.

To facilitate the separation of the parts or units of which the flashlight is composed, the lower extremities of the arms 45 of the slide shank may have rounded cam edges 68 for receiving thereover the jaws 69 of a suitable tool 70. The tool 70 may, as shown in Figure 12, comprise a flat bar or strip of sufficient inherent resistance to bending for accomplishing the purpose. The jaws 69 are provided upon the upper end of the tool 70 by the formation of a slot 71 in the upper end of the tool of sufficient width to receive the lower ends of the arms 45 when the latter are compressed together for releasing the slide shank from the thumb piece 47. The jaws 69 are preferably rounded at their inner upper corners to engage and ride over the cam surfaces 68 of the arms 45 when the tool 70 is forced upwardly within the flashlight through the bottom of the casing 25. The tool 70 is adapted to compress the arms 45 to release the flanges 46 of the thumb piece from the slots 52.

The inner or bottom end of the flashlight casing 25 is closed by a cap 72 which is threaded or otherwise detachably secured to the inner end of the casing and which is provided interiorly with a spring 73, shown in dotted lines in Figure 1, for yieldable engagement against the rearmost battery 26 for urging the batteries into contact with one another and also with the contact strip 34 in the forward end of the casing. The flashlight is grounded in the usual manner through the spring 73.

In the modification, shown in Figures 13 to 18, the outer end wall 74 is separate from the casing and is of disc form with a desired number of notches or recesses 75 in its outer edge, four notches being shown in the present instance. This end wall 74 is adapted to fit into the outer open end of the casing 25 and is supported upon a plurality of nibs or projections 25a which are sheared inwardly from the wall of the casing 25 adjacent its outer end, as shown in Figures 13 and 14. To hold the wall or disc 74 seated upon the nibs 25a, the upper edge portion of the casing 25, outwardly of the disc 74, is spun or turned over against the outer surface of the wall 74 for retaining the same permanently in the outer or upper end of the casing 25. During the spinning operation, the metal of the casing being operated upon is forced to a more or less extent into the notches 75 of the end wall 74 so as to hold the end wall or disc 74 from turning in the outer end of the casing. This insures the holding of the various parts in their proper relative relation when mounted in the casing. The intermediate portion of the end wall 74 has a central depressed disc 76 providing a cavity for the reception of the lower side of the head on the slide which carries the lamp socket.

The slide is provided with a modified form of inner strip 77, shown in detail in Figure 17, and which has its head portion of the same construction as shown in Figure 9, but which has a longer shank portion having its lower end recessed and overturned to provide a pair of spring tongues 78 which lie against the exposed side of the strip 77 and which serve as battery holding elements for engaging the outer side of the battery 26 to hold the latter firmly in the casing 25. The battery holding tongue 44 of the first described form of the invention, as shown in Figure 7, is stamped from the outer strip 35, but in the modified form shown in Figures 13, 14 and 17 the shank of the strip 77 is of such length as to dispose its tongues 78 in substantially the same relative position upon the slide as are the lugs 44, as is disclosed in Figures 2 and 7.

The tongue 79 which engages the battery contact 34 is struck at its base from the lower end portion of the strip 77 and is offset inwardly from the shank of the strip to lie in the path of the projecting end of the battery contact 34, as shown in Figure 13, so that when the slide is moved outwardly of the casing the spring tongue 79 will contact and wipe against the battery contact 34 to close the circuit, and maintain the circuit closed during the adjustment of the slide into the various desired positions.

In assembling the flashlight of this construction, the various parts or units may be individually completed before assembling. The lamp carrying slide is now mounted in the casing by inserting the shank thereof into the casing through the slot 29 and advancing the lower split end of the shank downwardly between the guide flanges of the casing. Immediately prior to the insertion of the lower end of the shank into the guides 51, the latch plate 53 is preferably fitted into place with its shoulders or flanges 54 projecting inwardly about the top and bottom edges of the guide flanges 51 so that the latch plate is held from lengthwise movement. Also, just prior to the insertion of the lower end of the slide into the guide flanges, the thumb piece 47 with its face plate 48 is placed against the outer side of the casing over the slot or opening 50 and with its flanges 46 projecting into the guide flanges 51. The slide is now forced downwardly so that the split lower end thereof is sprung together and passes between the guide flanges 46 and against the inner sides of the shoulders 53¹. As soon as the slide moves downwardly a distance sufficient to bring the recesses 52 into register with the flanges 46, the split end of the shank expands and the flanges 46 are received in the recesses 52 for interlocking the thumb piece with the slide to move as a unit therewith, and to also securely lock the latch plate, the slide and the thumb piece with their respective parts from accidental movement from the casing 25.

The only manner in which the parts may be released or separated as by the contraction or springing together of the arms 46 which form the lower split end of the shank. This cannot be easily done as the arms 46 are located intermediate the ends of the casing and at the inner side thereof so that access cannot readily be had to them. A suitable tool, of special construction, such as shown in Figure 12, has to be used and this tool may be introduced through the lower or inner end of the casing 25 to engage the jaws 69 against the lower end of the shank, and by upward pressure of the tool, while holding the slide against upward movement, effects the contraction of the lower end of the shank sufficiently to escape the flanges 46 so that the slide may be drawn upwardly from the flanges and thus release all of the parts for quick and easy separation, interchange and repair. The tool 70 is adapted for use only by repairmen, salesmen and the like who are instructed in the proper use and handling of the tool and the parts of the flashlight, and who are thus authorized to separate the parts.

With this construction the assembling of the parts will be made relatively easy and economical, and the parts themselves as manufactured may be more easily and readily handled, and comprise relatively few parts. There is thus produced a flashlight which admits of easy and economical manufacture, and one which in use possesses the various advantages of focusing the flashlight as desired, controlling the opening and closing of the circuit of the flashlight, and otherwise handling the same, all with one hand.

It is obvious that various changes and modifications may be made in the details of construction and design of the above specifically described embodiment of this invention without departing from the spirit thereof, such changes and modifications being restricted only by the scope of the following claims.

What is claimed is:

1. In a flashlight, a casing having an outer end wall, a battery contact mounted in insulating relation upon the inner side of said wall for engaging a battery and having one end projecting toward the side of the casing, a lamp carrying slide having a shank projecting down within one side of the casing and having a split and spread lower end, said slide having a head portion extending across the outer end of the casing, a head shell carried by the casing having a reflector therein adapted to enclose a lamp carried on said slide, a thumb piece mounted on the outer side of the casing and having inwardly extending flanges embracing the split end of the slide shank for interlocking engagement therewith and release therefrom by contraction of said split and spread end of the slide shank, said slide having a contact tongue at its inner side for engagement with the projecting end of the battery contact when the slide is shifted outwardly in the casing.

2. In a flashlight, a casing having an end wall with a slot therein and having an opening in one side with guide flanges extending inwardly from the opposite sides of the opening, a lamp carrying slide having a shank slidably engaging through the slot in the end wall of the casing and having a lower split spring end slidably engaging between said guide flanges of the casing, a thumb piece mounted on the outer side of the casing over said opening and having flanges extending inwardly through the opening and releasably interlocking with said split spring lower end of the slide shank and adapted for sliding engagement in the guide flanges in the casing, whereby the slide and thumb piece are interconnected for movement as a unit and are held in their relative positions at the opposite sides of the wall of the casing.

3. In a flashlight, a casing having an opening in its side and with inwardly offset guide flanges at opposite sides of the opening, a lamp carrying slide having a shank disposed within the casing and having a split lower end slidably engaging in said guide flanges and having recesses in the opposite outer edges of said split end, a thumb piece disposed at the outer side of the casing and having flanges extending inwardly through the opening of the casing and into engagement with said guide flanges, said flanges of the thumb piece seating in said recesses of the slide shank and adapted to be released therefrom by the contraction of the split end of the shank, whereby said slide and thumb piece may be assembled together at opposite sides of the wall of the casing and interlocked for movement as a unit, and whereby said slide and said thumb by the contraction of the split end of the slide shank.

4. In a flashlight, a casing, a lamp carrying slide disposed at the outer end of the casing and having a shank projecting into the casing at the inner side of the wall thereof, said wall of the casing having an opening therethrough and provided with inwardly offset guide flanges at opposite sides of the opening for slidably receiving therein the lower end of the slide shank, a thumb piece disposed at the outer side of the casing over said opening, said thumb piece having a pair of connecting flanges projecting through the opening and embracing the lower end of the slide within the guide flanges, said lower end of the slide being longitudinally slotted to provide a pair of arms and said arms having recesses therein for interlocking engagement with the flanges of the thumb piece for shifting the slide when the thumb piece is moved on the casing, said lower end of the shank having transverse sockets therein, and a latch plate mounted on the guide flanges of the casing inwardly of the flanges of the thumb pieces and having an outwardly pressed tongue for frictional engagement with the slide shank and for yieldable interlocking engagement with the sockets thereof to hold the slide in various positions of adjustment.

5. In a flashlight, a casing having an opening in one side thereof and inwardly offset guide flanges at opposite sides of the opening, a latch plate fitting between said guide flanges and having shoulders at opposite ends engaging the guide flanges to hold the latch plate from movement thereon, said latch plate having a spring tongue projecting outwardly toward said opening in the casing in the wall, a slide carried by the casing having a shank projecting between said guide flanges and against said latch plate to hold the latter in position, said shank having transverse sockets therein adapted to receive and yieldably hold said spring tongue for yieldably maintaining the slide in various adjusted positions, a thumb piece slidably disposed against the outer side of the casing and having flanges projecting inwardly through said opening and in interlocking engagement with said slide shank, and a face plate mounted against the outer side of the casing over the opening therein and having slots for the reception of the flanges of the thumb piece for holding the face plate thereto.

6. In a flashlight, a casing, a lamp carrying slide mounted on the casing and having a shank extending downwardly at the inner side of the casing, said shank having a split lower end providing a pair of outwardly sprung arms and said arms having recesses in their outer edges, said casing having an opening in said side thereof with guide flanges at the inner side of the opening for receiving the shank therein, a thumb piece slidably mounted on the outer side of the casing and having flanges extending through the opening and fitting in said recesses of the shank arms to interlock the thumb piece and the slide together, and means insertable through the lower end of the casing for interfitting engagement with said outwardly sprung arms of the shank to contract the arms and free the thumb piece flanges from the recesses thereof, whereby said slide may be drawn out of the casing to separate the slide and the thumb piece from the casing and from each other.

7. In a flashlight, a casing having an opening in one wall thereof with guide flanges at opposite sides of the opening and extending into the casing, a slide for the casing having a shank extending along the inner wall thereof and between said guide flanges, a thumb piece disposed at the outer side of the casing with connecting flanges extending through the casing opening, said slide shank having recesses in its opposite edges for interlocking engagement with the connecting flanges of the thumb piece and having a longitudinal slot admitting of the contraction of the shank to free said connecting flanges, a latch plate removably interlocked with said guide flanges of the casing and having a spring tongue bearing against said slide shank to tension the latter and the thumb piece upon the casing, said tongue having an outwardly pressed transverse rib and said shank having transverse recesses therein for the reception of said rib of the tongue to yieldingly hold the slide and the thumb piece in various adjusted positions.

8. In a flashlight, a casing, an end wall secured to the outer end of the casing, a central battery contact mounted in insulated relation upon said wall and having a projecting portion directed edgewise of the wall, a lamp carrying slide having a head portion adapted to carry a lamp and having a shank portion extending through said wall lengthwise into the casing, said slide having spaced conductor strips with an insulating strip therebetween, the inner strip having in its shank portion an inwardly offset tongue lying in the path of the projection of said battery contact strip for engaging with same to close the flashlight circuit when the slide is moved outwardly, said inner strip also having a pair of returned tongues upon its lower end projecting from the inner side of the strip for frictional contact with the side of an adjacent battery in the casing to hold the battery therein, the outer strip of the slide projecting beyond the inner strip and having a split lower end, and a thumb piece slidably mounted upon the exterior of the casing and having flanges extending inwardly through the wall of the casing and interlocked with said split end of the slide strip for operating the slide by movement of the thumb piece, said split end of the strip adapted to be flexed for releasing said flanges of the thumb piece to separate the thumb piece from the slide.

9. Control means for a flashlight having a casing, comprising a thumb piece slidable at the outer side of the casing and having a connecting part projecting inwardly through the casing, and a control slide movable in the casing having a connecting part, one of said connecting parts having a yieldable shoulder portion for interlocking engagement with the other connecting part to hold the thumb piece and the slide together for movement as a unit and in their respective positions on the casing, said yieldable shoulder portion adapted to be sprung for releasing the connecting parts from each other and freeing the thumb piece and the slide for removal from the casing.

EMERSON H. TOMPKINS.
IRVING T. HOLIHAN.